US012004499B1

(12) United States Patent
Machen

(10) Patent No.: US 12,004,499 B1
(45) Date of Patent: Jun. 11, 2024

(54) WRIST-WEARABLE FISHING KIT AND METHOD OF ASSEMBLING A WRIST-WEARABLE FISHING KIT

(71) Applicant: Andrew Tyler Machen, Knoxville, TN (US)

(72) Inventor: Andrew Tyler Machen, Knoxville, TN (US)

( * ) Notice: Subject to any disclaimer, the term of this patent is extended or adjusted under 35 U.S.C. 154(b) by 62 days.

(21) Appl. No.: 17/983,500

(22) Filed: Nov. 9, 2022

Related U.S. Application Data

(60) Provisional application No. 63/278,309, filed on Nov. 11, 2021.

(51) Int. Cl.
*A01K 97/06* (2006.01)
*A44C 5/00* (2006.01)
*A01K 89/08* (2006.01)

(52) U.S. Cl.
CPC .............. *A01K 97/06* (2013.01); *A44C 5/003* (2013.01); *A01K 89/08* (2013.01)

(58) Field of Classification Search
CPC ................................ A01K 97/06; A44C 5/003
See application file for complete search history.

(56) References Cited

U.S. PATENT DOCUMENTS

| | | | | |
|---|---|---|---|---|
| 357,206 A * | 2/1887 | Kamp | ................... | A01K 97/06 206/315.11 |
| 839,047 A * | 12/1906 | Sylvester | ............ | A44B 11/266 63/3 |
| 974,605 A * | 11/1910 | Schofield | ............... | A01K 97/06 2/209.13 |
| 2,813,368 A * | 11/1957 | Knowles | ................ | A01K 97/06 43/57.1 |
| 3,057,464 A * | 10/1962 | Baggott, Sr. | ........... | A01K 97/06 206/820 |
| 3,062,475 A * | 11/1962 | Miller, Jr. | ............ | B65H 75/143 242/405.1 |
| 3,126,662 A * | 3/1964 | White | .................... | A01K 97/06 242/405 |
| 3,213,564 A * | 10/1965 | Borell | .................... | A01K 97/06 43/57.2 |
| 3,337,981 A * | 8/1967 | Bowman | ................ | A01K 93/00 43/44.93 |
| 3,693,278 A * | 9/1972 | Mahone, Jr. | ........... | A01K 93/02 43/43.1 |
| 4,486,969 A * | 12/1984 | Swenson | ................ | A01K 93/02 43/17 |
| 4,768,688 A * | 9/1988 | Harrigan | ................ | A45D 34/00 63/3 |
| 5,297,676 A * | 3/1994 | Coleman | ................ | A01K 97/06 206/315.11 |
| 5,338,244 A * | 8/1994 | Huang | ................... | A63B 19/00 446/236 |
| 5,533,297 A * | 7/1996 | Crosby | .................. | A01K 97/06 43/57.1 |
| 5,622,293 A * | 4/1997 | LeFevre | ................. | A44C 5/003 63/23 |
| 5,671,856 A * | 9/1997 | Lisch | ................. | B65D 21/0228 220/4.27 |
| 5,934,464 A * | 8/1999 | Vargo | .................... | A01K 97/06 206/815 |

(Continued)

*Primary Examiner* — Jessica B Wong
(74) *Attorney, Agent, or Firm* — Robinson IP Law, PLLC

(57) ABSTRACT

A wrist wearable fishing kit in unassembled or assembled state, and a method of assembling a wrist wearable fishing kit.

18 Claims, 10 Drawing Sheets

(56) References Cited

U.S. PATENT DOCUMENTS

| | | | | |
|---|---|---|---|---|
| 5,983,556 | A * | 11/1999 | Zaloga | A01K 97/06 43/57.1 |
| 7,222,743 | B1 * | 5/2007 | Wilhelm | A01K 97/06 220/560 |
| 8,341,871 | B2 * | 1/2013 | Kavanaugh | A01K 93/00 43/44.87 |
| 8,708,194 | B2 | 4/2014 | Pascatore | |
| D734,196 | S * | 7/2015 | Horvatinovich | D11/3 |
| 9,622,552 | B2 | 4/2017 | Pemberton | |
| 9,693,607 | B2 | 7/2017 | Imbriani | |
| 10,010,163 | B2 | 7/2018 | Wells | |
| 10,123,607 | B1 * | 11/2018 | Hardy | A45D 40/261 |
| 2006/0166720 | A1 | 7/2006 | Dixon | |
| 2008/0222941 | A1 | 9/2008 | Scrimgeour | |
| 2013/0014425 | A1 * | 1/2013 | Reynolds | A01K 93/00 43/17.5 |
| 2014/0047866 | A1 * | 2/2014 | Vaughan | A44C 7/00 63/3.1 |
| 2014/0339118 | A1 * | 11/2014 | Sperrazza | A45F 5/00 206/457 |
| 2017/0119109 | A1 * | 5/2017 | Imbriani | A45D 40/24 |
| 2017/0196774 | A1 * | 7/2017 | Ohl | G16H 20/30 |
| 2017/0280700 | A1 * | 10/2017 | Parker | B65D 25/54 |
| 2018/0098531 | A1 * | 4/2018 | Henderson | A01K 97/06 |
| 2021/0084877 | A1 * | 3/2021 | Ogarrio | A01K 97/06 |

* cited by examiner

WRIST-WEARABLE FISHING KIT AND METHOD OF ASSEMBLING A WRIST-WEARABLE FISHING KIT

CROSS-REFERENCE(S) TO RELATED APPLICATION(S)

This application is a non-provisional application which claims priority to U.S. Provisional Patent Application No. 63/278,309 entitled "A Wrist Wearable Fishing Kit" which was filed on Nov. 11, 2021, the entirety of which is incorporated herein by reference.

FIELD

This disclosure relates to the field of fishing and fishing kits. More particularly, this disclosure relates to a wrist-wearable fishing kit.

BACKGROUND

Fishing and fishing accessories have been used for centuries to catch fish as a food source. In some situations, successful fishing is necessary for survival. Over the centuries, humans have become more sophisticated with fishing techniques and fishing tools. When hiking or camping deep in the wilderness, it is helpful to have a fishing kit in order to catch fish that can be used as a food source. However, when hiking, every bit of materials that are taken add to the weight of any backpack used. Therefore, bringing a large fishing kit and bulky fishing rod is undesirable.

What is needed, therefore, is a compact fishing kit that will not add weight to a backpack when hiking and/or camping.

SUMMARY

In one aspect, the above and other needs are met by a first wrist-wearable fishing kit comprising a tube cut to a length to fit around the wrist of a person, the tube comprising a tube first end and a tube second end; a fishing float including a fishing float aperture therethrough, the fishing float aperture including an aperture first end and an aperture second end; a fishing hook, fly lure, or both a fishing hook and a fly lure; and a length of fishing line; wherein the tube first end is configured to fit tightly inside the aperture first end of the fishing float aperture, and wherein the tube second end is configured to fit tightly inside the aperture second end of the fishing float aperture. The kit may further include a fishing weight, a piece of aluminum foil, a match, a cotton ball covered with a fire accelerant, a safety pin, a paperclip, or combinations thereof.

In another aspect, the first wrist wearable fishing kit described above comprises a first assembled embodiment of the wrist wearable fishing kit. In one version of the first assembled embodiment, the fly lure and the length of fishing line are stored in the internal chamber, the tube first end is attached to the aperture first end of the fishing float aperture, and the tube second end is attached to the aperture second end of the fishing float aperture. A fishing weight may also be stored in the internal chamber of the tube. Additionally or alternatively, a piece of aluminum foil may also be stored in the internal chamber of the tube. Additionally or alternatively, a match and a cotton ball covered with a fire accelerant may also be stored in the internal chamber of the tube. In another version of the first assembled embodiment, the fishing hook and the length of fishing line are stored in the internal chamber, the tube first end is attached to the aperture first end of the fishing float aperture, and the tube second end is attached to the aperture second end of the fishing float aperture. A fishing weight may also be stored in the internal chamber of the tube. Additionally or alternatively, a piece of aluminum foil may also be stored in the internal chamber of the tube. Additionally or alternatively, a match and a cotton ball covered with a fire accelerant may also be stored in the internal chamber of the tube.

In another aspect, a second wrist wearable fishing kit is disclosed, the fishing kit comprising a first tube including a first diameter of a first size, the first tube further comprising a first tube first end and a first tube second end; a second tube including a second diameter of a second size, the second tube further comprising a second tube first end and a second tube second end; a fishing float including a fishing float aperture therethrough wherein the first tube is configured to fit through the fishing float aperture; a fishing hook, fly lure, or a combination thereof; and a length of fishing line; wherein the first tube first end is configured to fit tightly inside the second tube first end, and wherein the first tube second end is configured to fit tightly inside the second tube second end. The kit may further include a fishing weight, a piece of aluminum foil, a match, a cotton ball covered with a fire accelerant, a safety pin, a paperclip, or combinations thereof.

In another aspect, the second wrist wearable fishing kit described above comprises an assembled second wrist wearable fishing kit wherein the first tube further comprises a first tube internal chamber; and the fish hook and the length of fishing line stored in the first tube internal chamber; wherein the first tube first end is attached to the second tube first end; wherein the first tube second end is attached to the second tube second end; and wherein the first tube extends through the fishing float aperture such that the fishing float is attached along the first tube. In a related embodiment, the second wrist wearable fishing kit described above comprises an assembled second wrist wearable fishing kit wherein the first tube further comprising a first tube internal chamber; and the fly lure and the length of fishing line stored in the first tube internal chamber; wherein the first tube first end is attached to the aperture first end of the fishing float aperture; wherein the first tube second end is attached to the second tube first end; wherein the first tube second end is attached to the second tube second end; and wherein the first tube extends through the fishing float aperture such that the fishing float is attached along the first tube.

The assembled second wrist wearable fishing kits described above may further include a fishing weight stored in the first tube internal chamber. Additionally or alternatively, the assembled second wrist wearable fishing kit may further include a piece of aluminum foil stored in the first tube internal chamber. Additionally or alternatively, the assembled second wrist wearable fishing kit may further include a match and a cotton ball covered with a fire accelerant, both of which are stored in the first tube internal chamber.

In another aspect, embodiments of the disclosure provide a method of assembling a wrist wearable fishing kit, the method comprising inserting a fishing hook, a fly lure, or a combination thereof into an internal chamber of a tube, the tube comprising a tube first end and a tube second end; inserting a length of fishing line into the internal chamber of the tube; attaching the tube first end to an aperture first end of a fishing float; and attaching the tube second end to an aperture second end of the fishing float. The step of inserting a length of fishing line into the internal chamber of the tube may further comprise inserting a fishing weight, a match, a cotton ball coated with a fire accelerant, a safety pin, a paper clip, a piece of aluminum foil or combinations thereof into the internal chamber of the tube.

In another aspect, a method of assembling a wrist wearable fishing kit is disclosed, the method comprising inserting a fishing hook, a fly lure, or a combination thereof into a first tube internal chamber of a first tube, wherein the first tube further comprises a first tube first end and a first tube second end; inserting a length of fishing line into the first tube internal chamber; inserting the first tube through a fishing float aperture of a fishing float; attaching the first tube first end to a second tube first end of a second tube; and attaching the first tube second end to a second tube second end of the second tube. Additionally or alternatively, the method may further include inserting a fishing weight, a match, a cotton ball coated with a fire accelerant, a safety pin, a paperclip, a piece of aluminum foil, or combinations thereof into the first tube internal chamber.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Figure 1:
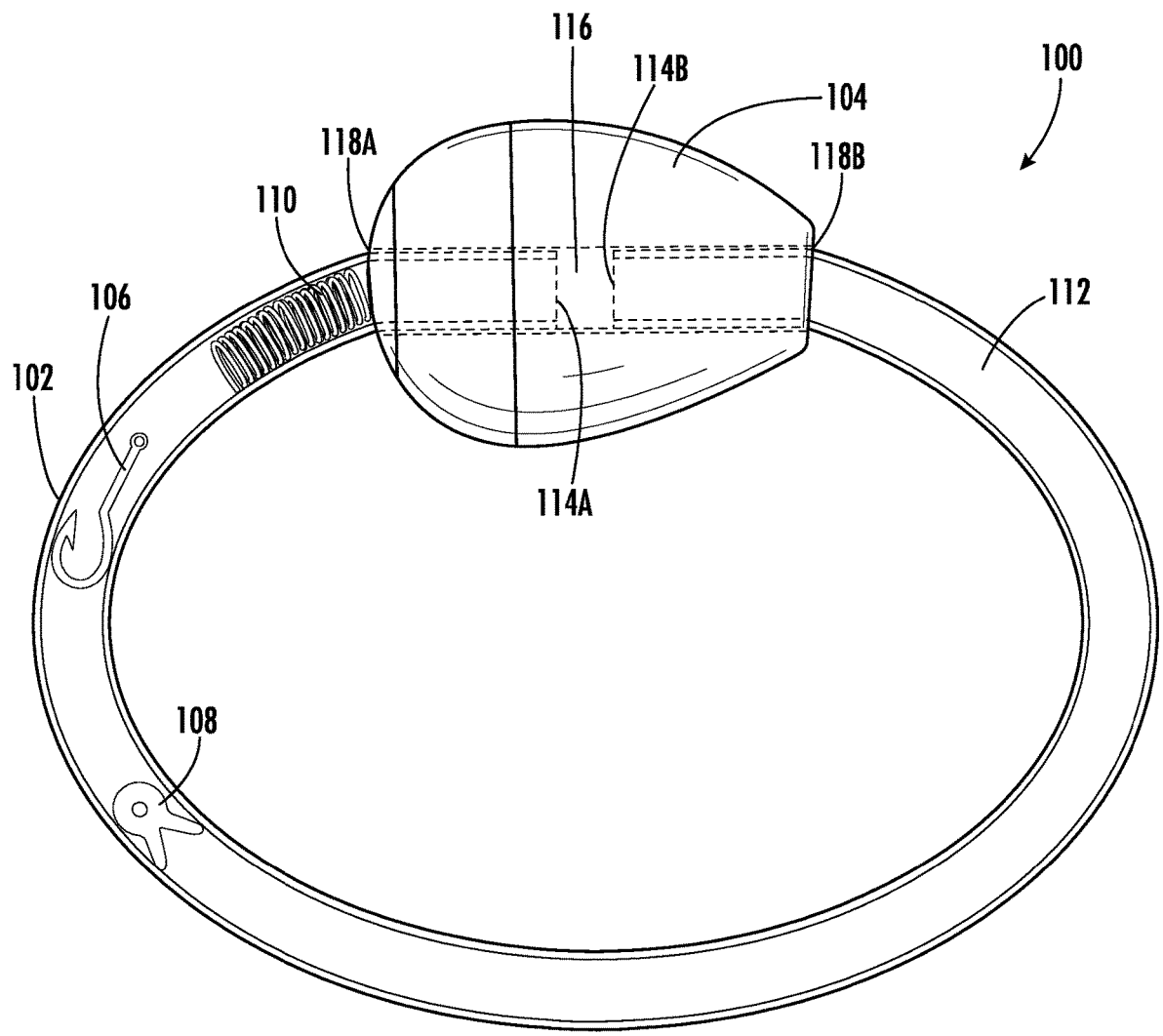
FIG. 1 shows an assembled version of a first embodiment of a wrist-wearable fishing kit.

FIG. 1 shows an embodiment of an assembled version of a wrist wearable fishing kit 100 comprising a tube 102, a fishing float 104 (also known as a "bobber"), a fishing hook 106, a fishing weight 108 (also known as a "sinker"), and fishing line 110. The tube 102 includes an internal chamber 112 wherein the fishing hook 106, the fishing weight 108, and the fishing line 110 are stored. The tube 102 includes a tube first end 114A and a tube second end 114B. The fishing float 104 includes an aperture 116 therethrough wherein the aperture 116 includes an aperture first end 118A and an aperture second end 118B. The tube first end 114A is preferably inserted into (and thereby attached to) the aperture first end 118A, and the tube second end 114B is preferably inserted into (and thereby attached to) the aperture second end 118B to form a bracelet that can be worn around a person's wrist.

The tube 102 is preferably a clear tube made of flexible material such as, for example, silicone, plastic, or rubber. The length of the tube 102 is selected to be long enough to fit around a person's wrist but not so long as to easily fall off a person's wrist. Because wrist size can vary from person to person, different versions of the wrist wearable fishing kit 100 may have tubes 102 with different lengths. The cross-sectional diameter of the tube 102 is preferably sized so that the tube first end 114A fits tightly inside the aperture first end 118A and the tube second end 114B fits tightly inside the aperture second end 118B. If needed glue or other adhesive may be used at these connections to further secure the various components together and/or to provide a seal to prevent water from entering the internal chamber 112.

Figure 2:
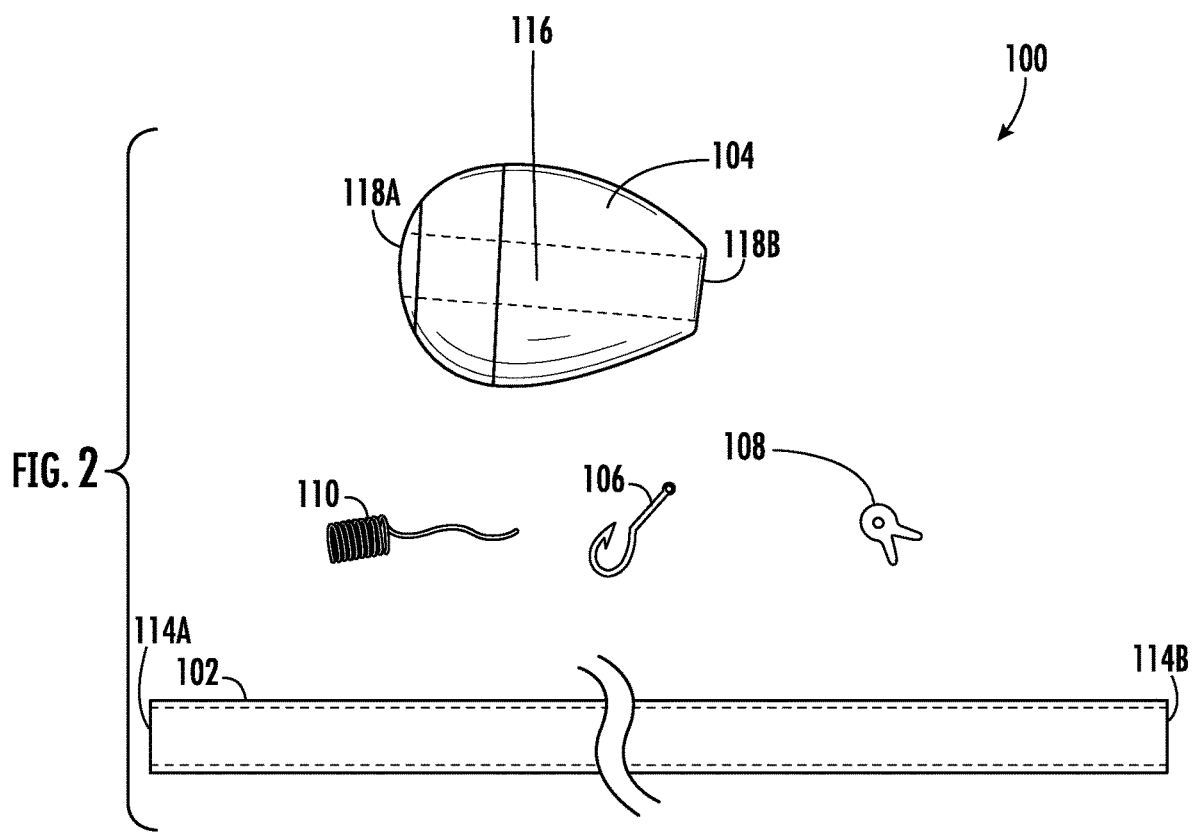
FIG. 2 shows a disassembled version of the wrist-wearable fishing kit shown in FIG. 1.

FIG. 2 shows a disassembled version of the wrist wearable fishing kit 100 with the various features described above including the tube 102, the fishing float 104, the fishing hook 106, the fishing weight 108, and the fishing line 110.

Figure 3:
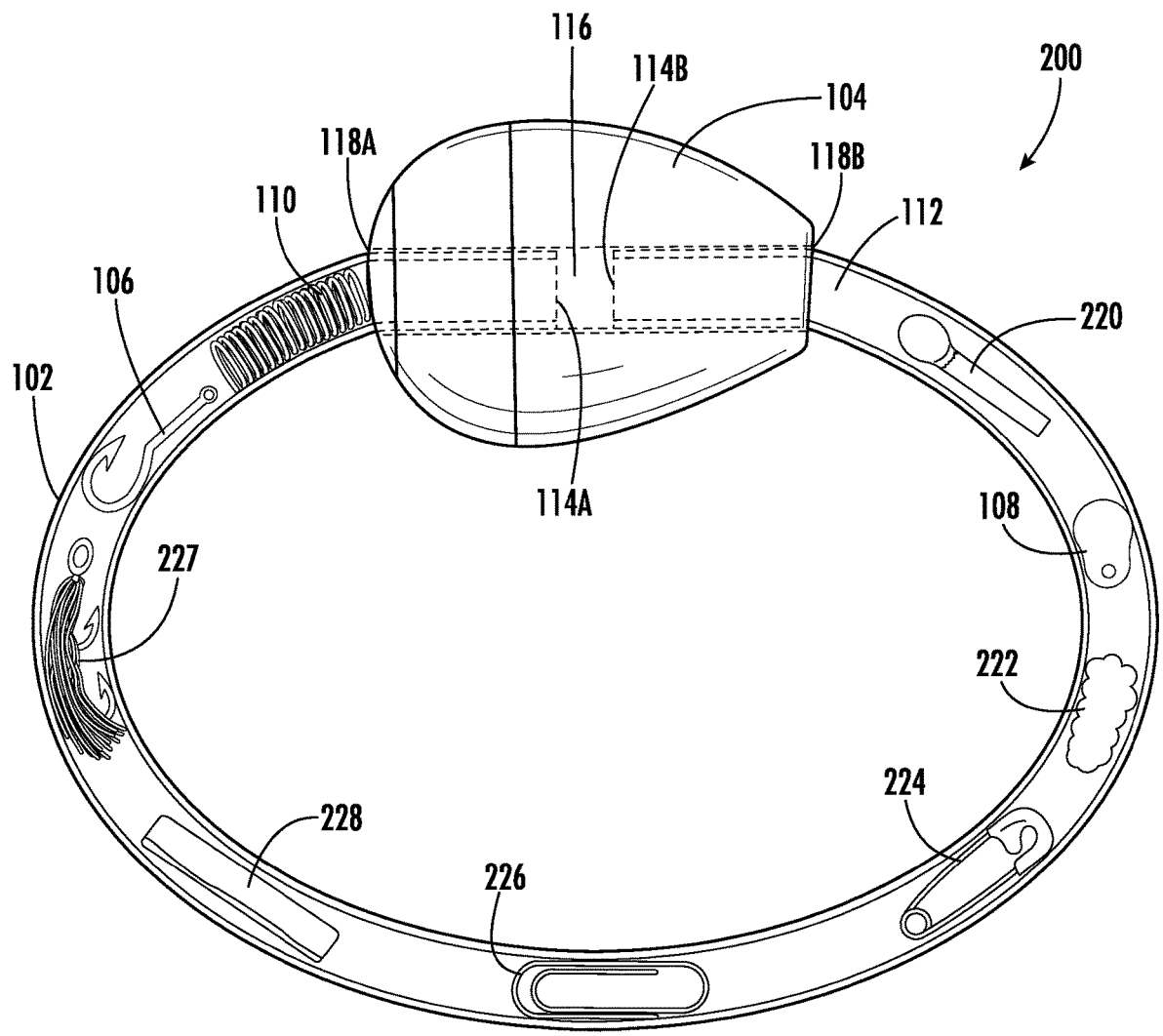
FIG. 3 an assembled version of a second embodiment of a wrist-wearable fishing kit.
Figure 4:
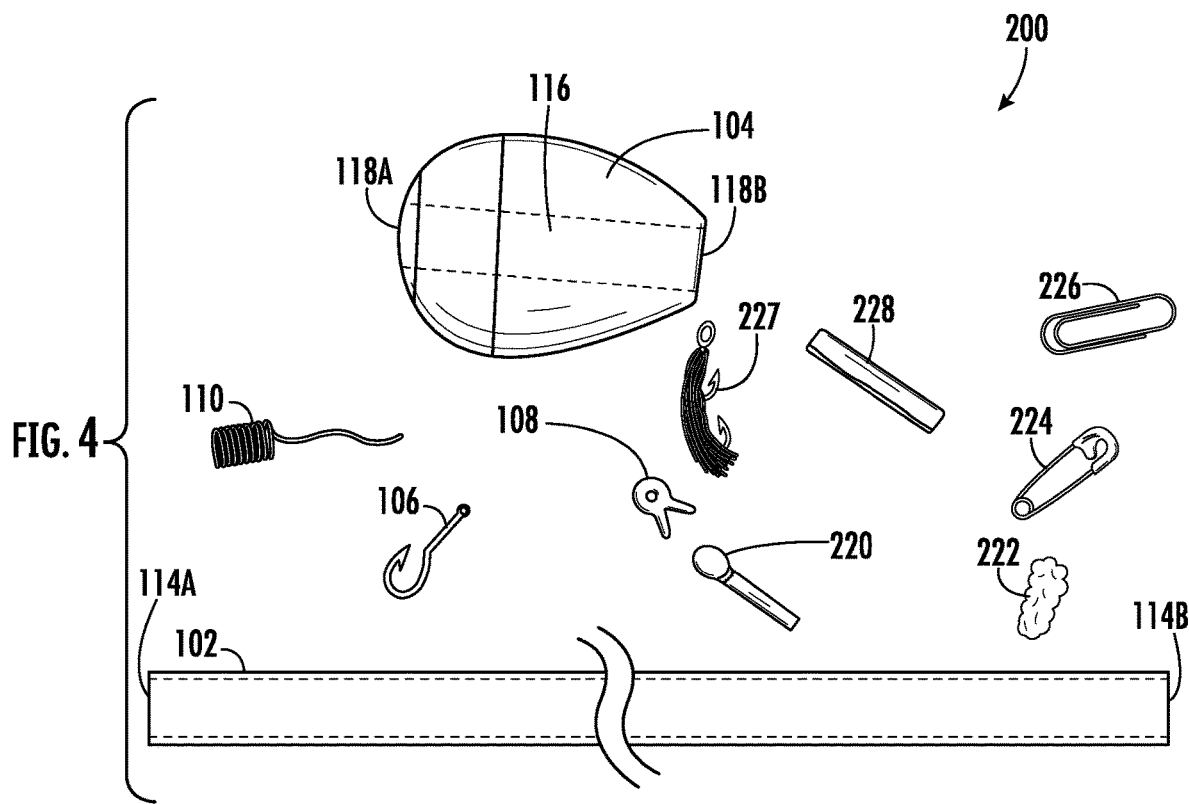
FIG. 4 shows a disassembled version of the wrist-wearable fishing kit shown in FIG. 3.

In addition to the components described above, other components stored in the internal chamber 112 may include, for example, a match 220, a cotton ball 222, a safety pin 224, a paperclip 226, a fly lure 227 and/or a small piece of aluminum foil 228. Preferably, the cotton ball 222 includes a fire accelerant (e.g., petroleum jelly) rubbed therein. This embodiment of an assembled version of a wrist wearable fishing kit 200 is shown in FIG. 3. A disassembled version of the fishing kit 200 is shown in FIG. 4. Other embodiments with different combinations of fishing components are contemplated. For example, one embodiment may include just the fly lure 227 and the fishing line 110 stored in the internal chamber 112. Alternatively, one embodiment may include just the fishing hook 106, the fishing line 110, and the piece of aluminum foil 228 stored in the internal chamber 112.

Figure 5:
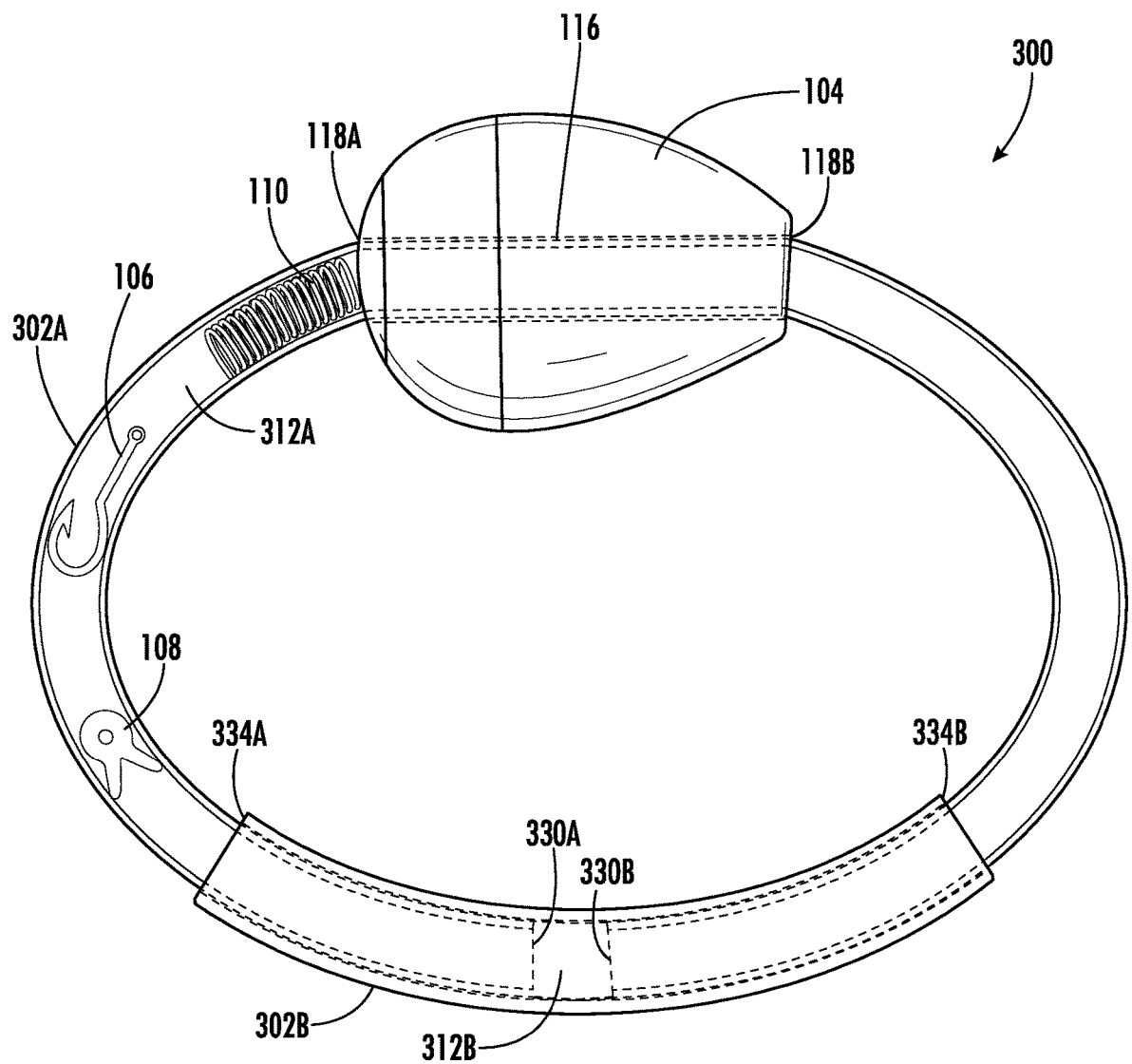
FIG. 5 shows an assembled version of a third embodiment of a wrist-wearable fishing kit.

FIG. 5 shows an embodiment of an assembled version of a wrist wearable fishing kit 300 comprising a first tube 302A, a second tube 302B, a fishing float 104 (also known as a "bobber"), a fishing hook 106, a fishing weight 108 (also known as a "sinker"), and fishing line 110. The first tube 302A includes a first tube internal chamber 312A wherein the fishing hook 106, the fishing weight 108, and/or the fishing line 110 are stored. The first tube 302A includes a first tube first end 330A and a first tube second end 330B. The second tube 302B includes a second tube first end 334A and a second tube second end 334B. In some embodiments, the diameter of the second tube 302B is wider than the diameter of the first tube 302A such that the first tube first end 330A preferably fits tightly inside and is attached to the second tube first end 334A, and the first tube second end 330B preferably fits tightly inside and is attached to the second tube second end 334B to form a bracelet that can be worn around a person's wrist. In an alternative embodiment, the diameter of the second tube 302B is narrower than the diameter of the first tube 302A such that the first tube first end 330A preferably fits tightly outside the second tube first end 334A, and the first tube second end 330B preferably fits tightly outside the second tube second end 334B. Glue or other adhesive may be used to secure the first tube first end 330A to the second tube first end 334A, and to secure the first tube second end 330B to the second tube second end 334B. The glue or other adhesive also can be used as a waterproofing component to prevent water from entering the first tube interior chamber 312A. The first tube 302A and the second tube 302B are preferably clear tubes made of flexible material such as, for example, silicone, plastic, or rubber. The length of the first tube 302A and the length of the second tube are selected to be long enough to fit around a person's wrist when combined but not so long as to easily fall off a person's wrist when combined.

The fishing float 104 includes an aperture 116 therethrough wherein the aperture 116 includes an aperture first end 118A and an aperture second end 118B. The fishing float 104 is preferably attached to the first tube 302A by inserting the first tube 302A through the fishing float aperture 116. This is preferably done before attaching the first tube 302A to the second tube 302B as described above.

Figure 6:
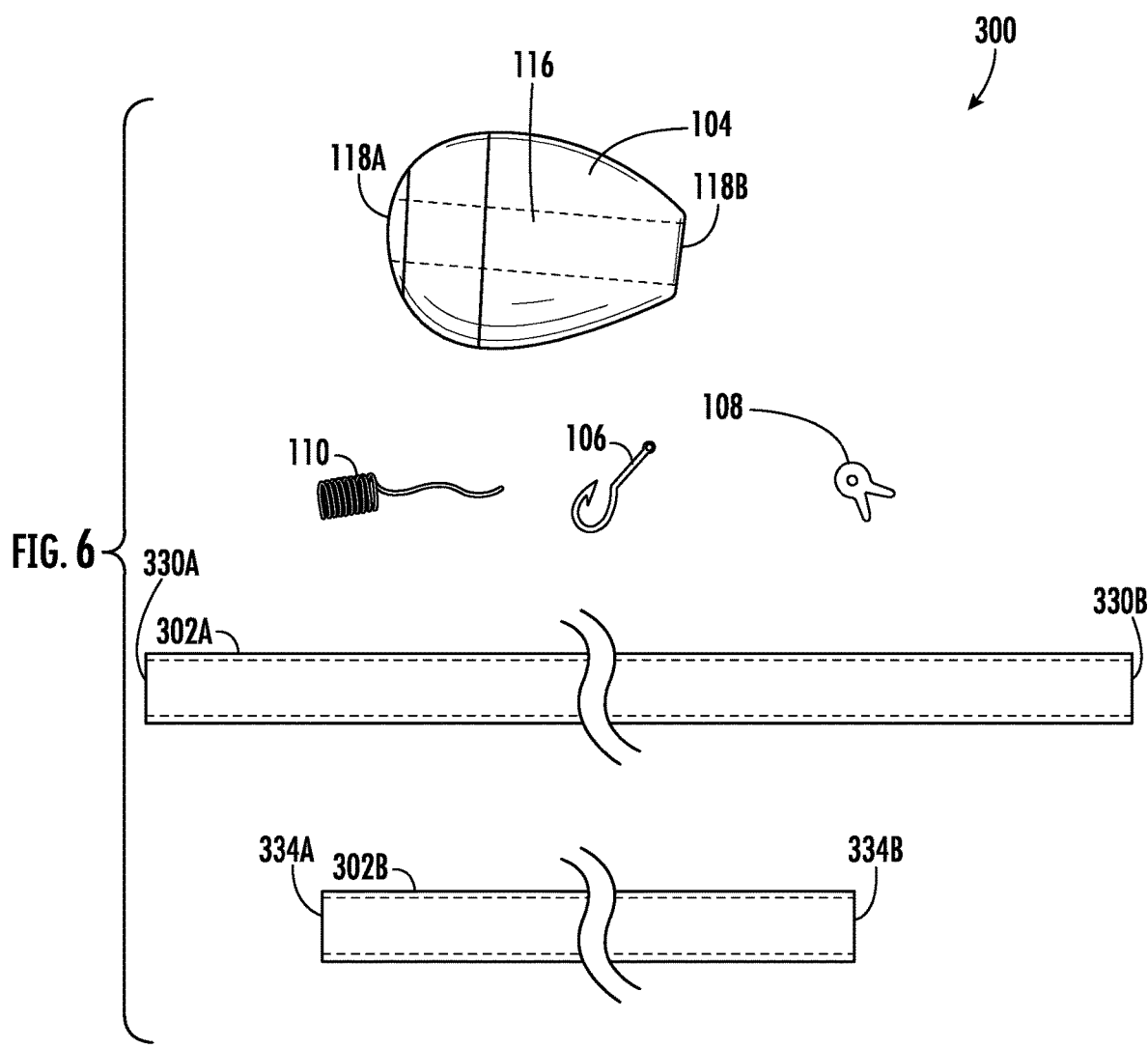
FIG. 6 shows a disassembled version of the wrist-wearable fishing kit shown in FIG. 5.

FIG. 6 shows a disassembled version of the wrist wearable fishing kit 300 with the various features described above including the first tube 302A, the second tube 302B, the fishing float 104, the fishing hook 106, the fishing weight 108, and the fishing line 110.

Figure 7:
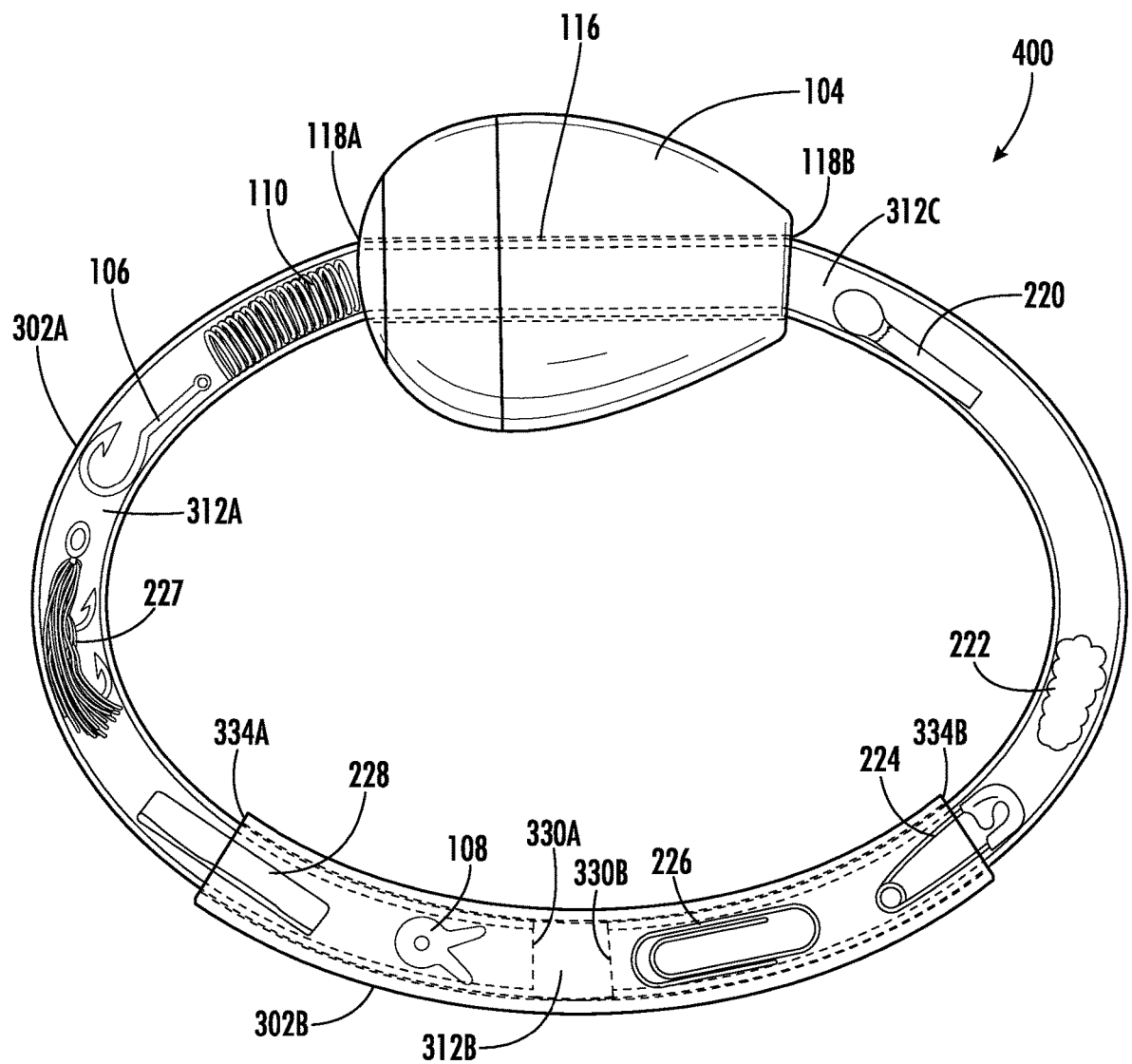
FIG. 7 shows an assembled version of a fourth embodiment of a wrist-wearable fishing kit.
Figure 8:
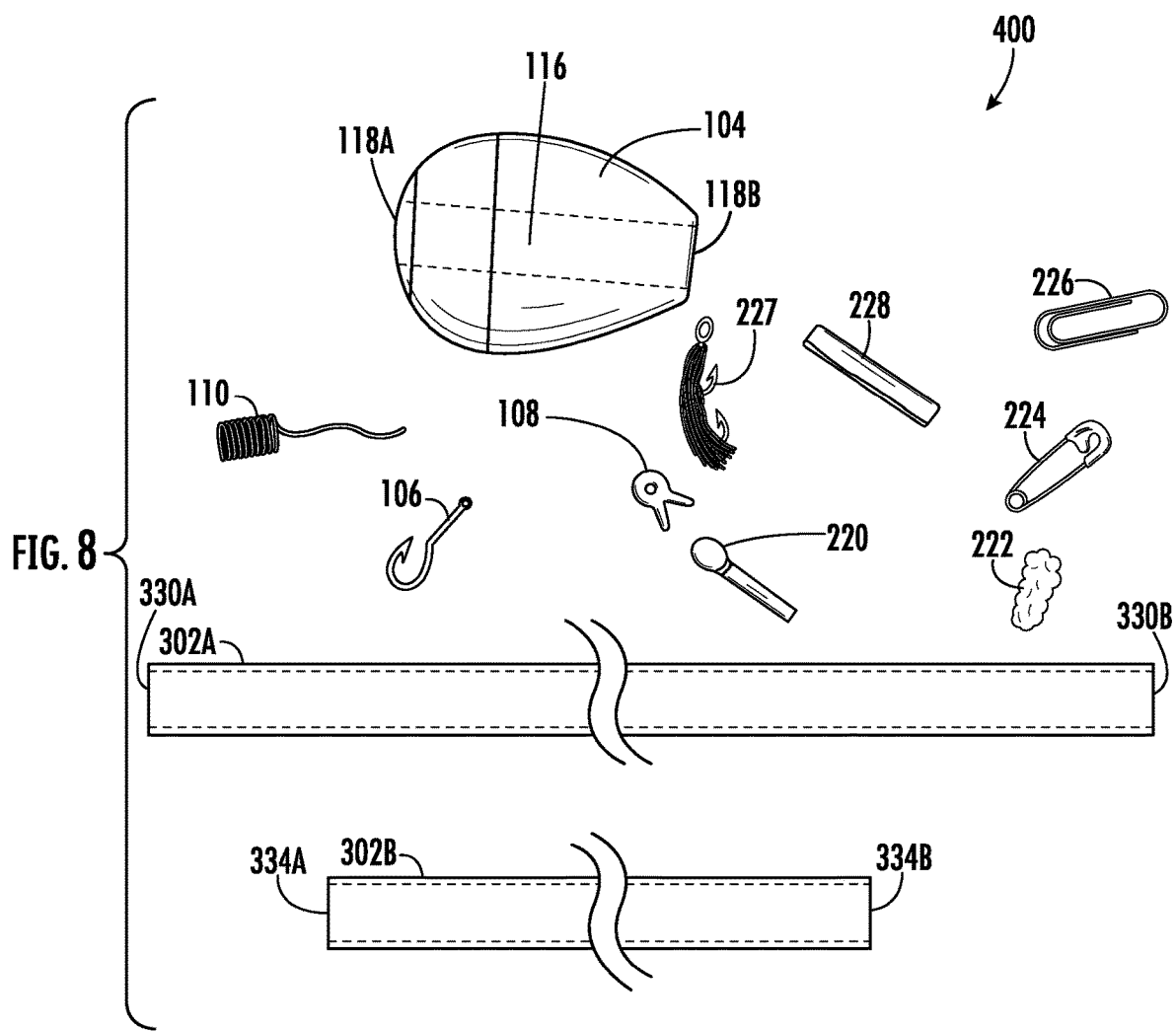
FIG. 8 shows a disassembled version of the wrist-wearable fishing kit shown in FIG. 7.
Figure 9:
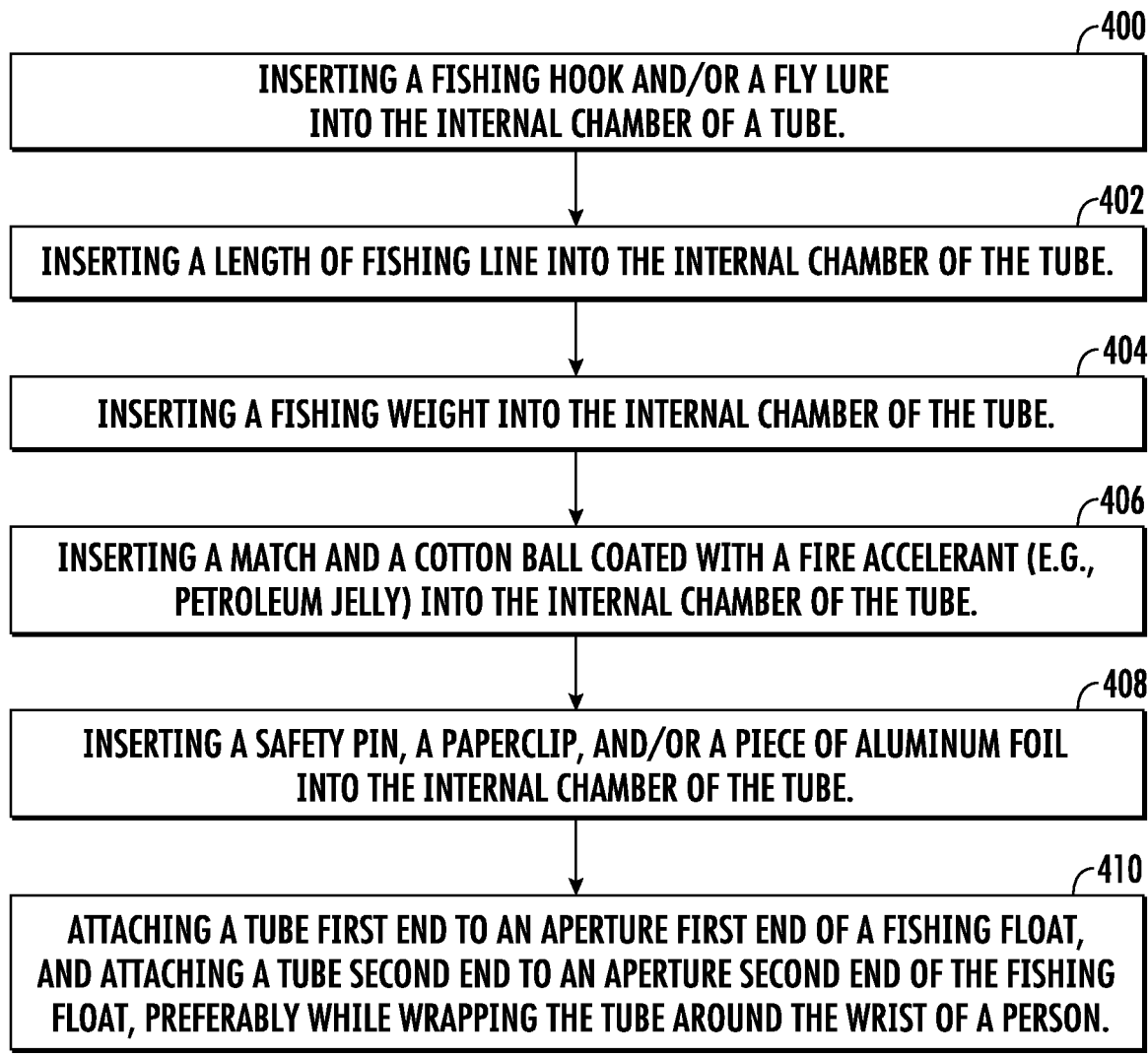
FIG. 9 shows a method of assembling a fifth embodiment of a wrist-wearable fishing kit.
Figure 10:
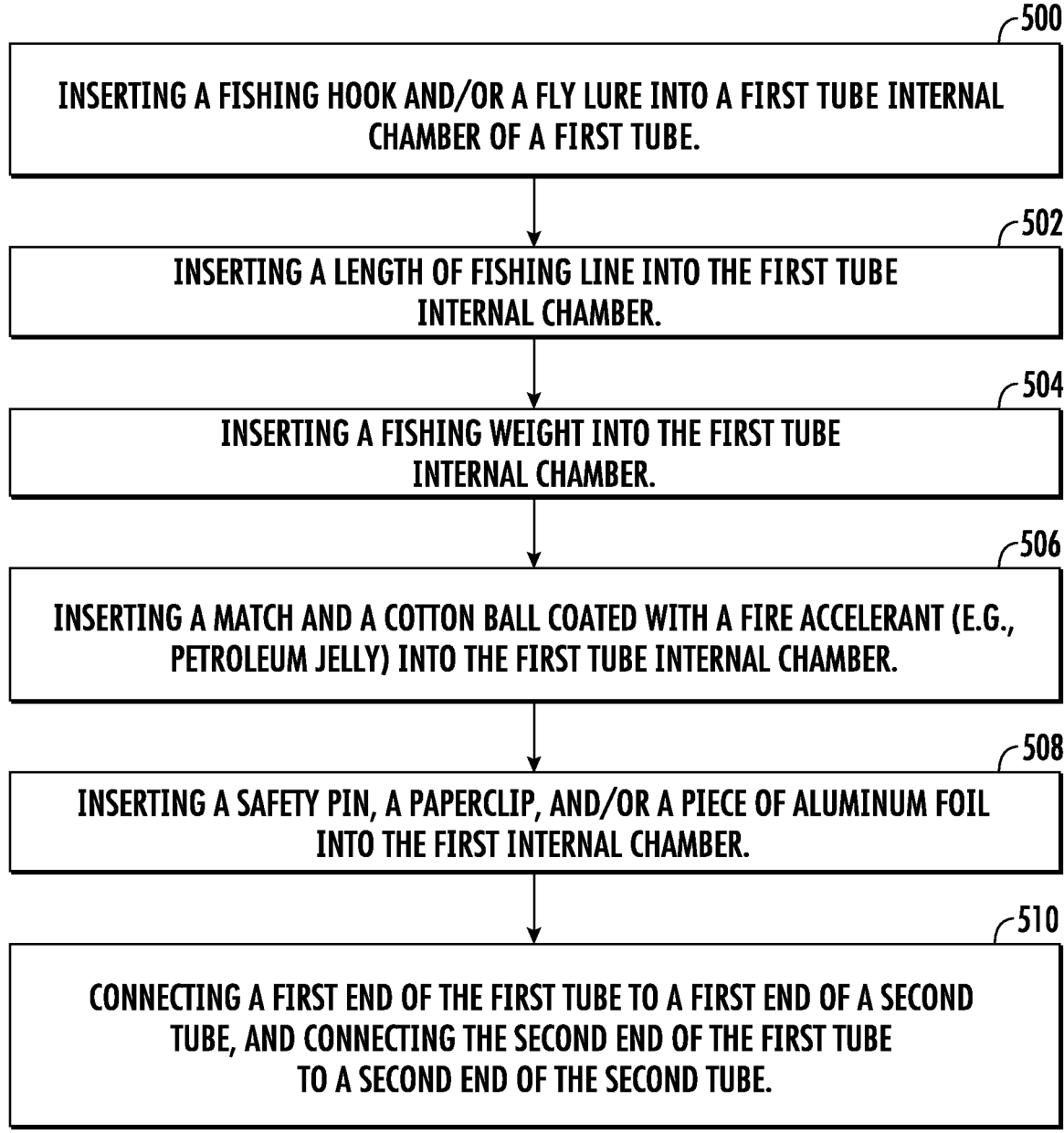
FIG. 10 shows a method of assembling a sixth embodiment of a wrist-wearable fishing kit.

In addition to the components described above, other components stored in the first tube internal chamber 312A may include, for example, a match 220, a cotton ball 222, a safety pin 224, a paperclip 226, a fly lure 227 and/or a small piece of aluminum foil 228. Preferably, the cotton ball includes a fire accelerant (e.g., petroleum jelly) rubbed thereon. This embodiment of an assembled version of a wrist wearable fishing kit 400 is shown in FIG. 7. A disassembled version of the fishing kit 400 is shown in FIG. 8. Other embodiments with different combinations of fishing components are contemplated. For example, one embodiment may include just the fly lure 227 and the fishing line 110 stored in the first tube internal chamber 312A. Alternatively, one embodiment may include just the fishing hook 106, the fishing line 110, and the piece of aluminum foil 228 stored in the first tube internal chamber 312A.

The previously described embodiments of the present disclosure have many advantages, including being able to carry a fishing kit on a person's wrist. While being worn, the assembled fishing kit operates as a fashionable and unique bracelet. When using one of the kits described above, the fishing float 104 can be pulled apart from the tube 102 (or the first tube 302A pulled apart from the second tube 302B) to provide access to the internal chamber 112 (or the first tube internal chamber 312A). The components stored inside the tube 102 (or the first tube 302A) can then be removed and put into use. A first end of the fishing line 110 can be tied to a stick found in nature wherein the stick can operate as a fishing pole, and the fishing hook 106 can be tied to a second end of the fishing line 110. The fishing float 104 and the fishing weight 108 can also be attached along the fishing line 110. Live bait could be found in nature and attached to the fishing hook 106. If live bait is unavailable, the aluminum foil 228 can be attached to the fishing hook 106 as a fish attractant. In a different configuration, instead of the fishing hook 106, the fly lure 227 can be attached to the second end of the fishing line 110 without the use of the fishing float 104 or the fishing weight 108. The match 220 and cotton ball 222 can be used to start a fire to cook any fish caught using one of the fishing kits described above.

In addition to the kits described above, a method for assembling a wrist wearable fishing kit is also disclosed. The method includes 400 inserting a fishing hook and/or a fly lure into the internal chamber of a tube; and 402 inserting a length of fishing line into the internal chamber of the tube. The actual length of the fishing line may vary but is preferably at least ten feet long. The method optionally may further include 404 inserting a fishing weight into the internal chamber of the tube. The method optionally may further include 406 inserting a match and a cotton ball coated with a fire accelerant (e.g., petroleum jelly) into the internal chamber of the tube. The method optionally may further include 408 inserting a safety pin, a paperclip, and/or a piece of aluminum foil into the internal chamber of the tube. The method further includes 410 attaching a tube first end to an aperture first end of a fishing float, and attaching a tube second end to an aperture second end of the fishing float, preferably while wrapping the tube around the wrist of a person. The first step may further include cutting a first piece of tubing at a length that will fit around the wrist of a person.

In another aspect, a method for assembling a wrist wearable fishing kit includes 500 inserting a fishing hook and/or a fly lure into the first tube internal chamber of a first tube. The method further includes 502 inserting a length of fishing line into the first tube internal chamber. The actual length of the fishing line may vary but is preferably at least ten feet long. The method optionally may further include 504 inserting a fishing weight into the first tube internal chamber. The method optionally may further include 506 inserting a match and a cotton ball coated with a fire accelerant (e.g., petroleum jelly) into the first tube internal chamber. The method optionally may further include 508 inserting a safety pin, a paperclip, and/or a piece of aluminum foil the first tube internal chamber. The method further includes 510 connecting a first end of the first tube with a first end of the second tube. The connecting step 510 preferably includes connecting a second end of the first tube to a second end of the second tube, wherein the second tube preferably has a larger diameter than the first tube. During the connecting step 510, the first end of the first tube is preferably inserted into the first end of the second tube, and the second end of the first tube is preferably inserted into a second end of the second tube, preferably using glue or other adhesive. The connecting step 510 is preferably conducted while simultaneously wrapping the connected first tube and second tube around the wrist of a wearer.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

What is claimed is:

1. A wrist wearable fishing kit comprising:
   a tube cut to a length to fit around the wrist of a person, the tube comprising a tube first end and a tube second end;
   a fishing float including a fishing float aperture therethrough, the fishing float aperture including an aperture first end and an aperture second end;
   a member selected from the group consisting of a fishing hook, fly lure, and a combination thereof; and
   a length of fishing line;
   wherein the tube first end is configured to fit tightly inside the aperture first end of the fishing float aperture, and wherein the tube second end is configured to fit tightly inside the aperture second end of the fishing float aperture.

2. The kit of claim 1 further comprising a member selected from the group consisting of a fishing weight, a piece of aluminum foil, a match, a cotton ball covered with a fire accelerant, a safety pin, a paperclip, and combinations thereof.

3. The kit of claim 1 further comprising an assembled wrist wearable fishing kit comprising:
   the tube further comprising an internal chamber; and
   the fish hook and the length of fishing line stored in the internal chamber;
   wherein the tube first end is attached to the aperture first end of the fishing float aperture; and
   wherein the tube second end is attached to the aperture second end of the fishing float aperture.

4. The kit of claim 1 further comprising an assembled wrist wearable fishing kit comprising:
   the tube further comprising an internal chamber; and
   the fly lure and the length of fishing line stored in the internal chamber;
   wherein the tube first end is attached to the aperture first end of the fishing float aperture; and
   wherein the tube second end is attached to the aperture second end of the fishing float aperture.

5. The assembled wrist wearable fishing kit of claim 3 further comprising a fishing weight stored in the internal chamber of the tube.

6. The assembled wrist wearable fishing kit of claim 3 further comprising a piece of aluminum foil stored in the internal chamber of the tube.

7. The assembled wrist wearable fishing kit of claim 3 further comprising a match and a cotton ball covered with a fire accelerant, both of which are stored in the internal chamber of the tube.

8. A wrist wearable fishing kit comprising:
   a first tube including a first diameter of a first size, the first tube further comprising a first tube first end and a first tube second end;
   a second tube including a second diameter of a second size, the second tube further comprising a second tube first end and a second tube second end;
   a fishing float including a fishing float aperture therethrough wherein the first tube is configured to fit through the fishing float aperture;
   a member selected from the group consisting of a fishing hook, fly lure, and a combination thereof; and
   a length of fishing line;
   wherein the first tube first end is configured to be attached to the second tube first end, and wherein the first tube second end is configured to be attached to the second tube second end.

9. The kit of claim 8 further comprising a member selected from the group consisting of a fishing weight, a piece of aluminum foil, a match, a cotton ball covered with a fire accelerant, a safety pin, a paperclip, and combinations thereof.

10. The kit of claim 8 further comprising an assembled wrist wearable fishing kit comprising:
    the first tube further comprising a first tube internal chamber; and
    the fish hook and the length of fishing line stored in the first tube internal chamber;
    wherein the first tube first end is attached to the second tube first end;
    wherein the first tube second end is attached to the second tube second end; and
    wherein the first tube extends through the fishing float aperture such that the fishing float is attached along the first tube.

11. The kit of claim 8 further comprising an assembled wrist wearable fishing kit comprising:
    the first tube further comprising a first tube internal chamber; and
    the fly lure and the length of fishing line stored in the first tube internal chamber;
    wherein the first tube first end is attached to the second tube first end;
    wherein the first tube second end is attached to the second tube second end; and
    wherein the first tube extends through the fishing float aperture such that the fishing float is attached along the first tube.

12. The assembled wrist wearable fishing kit of claim 10 further comprising a fishing weight stored in the first tube internal chamber.

13. The assembled wrist wearable fishing kit of claim 10 further comprising a piece of aluminum foil stored in the first tube internal chamber.

14. The assembled wrist wearable fishing kit of claim 10 further comprising a match and a cotton ball covered with a fire accelerant, both of which are stored in the first tube internal chamber.

15. A method of assembling a wrist wearable fishing kit, the method comprising:
    inserting a member selected from the group consisting of a fishing hook, a fly lure, and a combination thereof into an internal chamber of a first tube, the first tube comprising a first tube first end and a first tube second end;
    inserting a length of fishing line into the internal chamber of the first tube;
    providing a fishing float comprising a fishing float aperture therethrough wherein the fishing float aperture further comprises a fishing float aperture first end and a fishing float aperture second end;
    attaching the first tube first end to the fishing float along the fishing float aperture first end; and
    attaching the first tube second end to the fishing float along the fishing float aperture second end.

16. The method of claim 15 wherein the step of inserting a length of fishing line into the internal chamber of the first tube further comprises inserting a member from the group consisting of a fishing weight, a match, a cotton ball coated with a fire accelerant, a safety pin, a paper clip, a piece of aluminum foil and combinations thereof into the internal chamber of the first tube.

17. A method of assembling a wrist wearable fishing kit comprising:
- inserting a member selected from the group consisting of a fishing hook, a fly lure, and a combination thereof into a first tube internal chamber of a first tube, wherein the first tube further comprises a first tube first end and a first tube second end;
- inserting a length of fishing line into the first tube internal chamber;
- inserting the first tube through a fishing float aperture of a fishing float;
- attaching the first tube first end to a second tube first end of a second tube; and
- attaching the first tube second end to a second tube second end of the second tube.

18. The method of claim 17 further comprising inserting a member selected from the group consisting of a fishing weight, a match, a cotton ball coated with a fire accelerant, a safety pin, a paperclip, a piece of aluminum foil, and combinations thereof into the first tube internal chamber before attaching the first tube to the second tube.

* * * * *